US012597277B2

(12) United States Patent
Yasui et al.

(10) Patent No.: US 12,597,277 B2
(45) Date of Patent: *Apr. 7, 2026

(54) LEARNING METHOD, LEARNING DEVICE, MOBILE OBJECT CONTROL DEVICE, MOBILE OBJECT CONTROL METHOD, AND STORAGE MEDIUM

(71) Applicant: HONDA MOTOR CO., LTD., Tokyo (JP)

(72) Inventors: Yuji Yasui, Wako (JP); Hideki Matsunaga, Wako (JP); Takashi Matsumoto, Wako (JP); Gakuyo Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 122 days.

This patent is subject to a terminal disclaimer.

(21) Appl. No.: 18/106,587

(22) Filed: Feb. 7, 2023

(65) Prior Publication Data

US 2023/0252804 A1 Aug. 10, 2023

(30) Foreign Application Priority Data

Feb. 8, 2022 (JP) ................................. 2022-017870

(51) Int. Cl.
*G06V 20/64* (2022.01)
*B60W 40/02* (2006.01)
(Continued)

(52) U.S. Cl.
CPC ............. *G06V 20/64* (2022.01); *B60W 40/02* (2013.01); *B60W 60/001* (2020.02); *G06T 3/00* (2013.01);
(Continued)

(58) Field of Classification Search
CPC ........ G06V 20/58; G06V 20/64; G06V 10/82; G06V 10/774; G06V 20/56; G06N 20/00;
(Continued)

(56) References Cited

U.S. PATENT DOCUMENTS 8,605,947 B2 12/2013 Zhang et al.
8,699,754 B2 4/2014 Zhang et al.
(Continued)

FOREIGN PATENT DOCUMENTS

CN 103299617 9/2013
CN 104094311 10/2014
(Continued)

OTHER PUBLICATIONS

Japanese Office Action for Japanese Patent Application No. 2022-017870 mailed Sep. 26, 2023.
(Continued)

*Primary Examiner* — Jay Khandpur
(74) *Attorney, Agent, or Firm* — Amin, Turocy & Watson, LLP

(57) ABSTRACT

A learning method includes steps of associating, with an extended area in a bird's-eye view image, an annotation indicating that the extended area is a three-dimensional object; and generating, based on training data in which a bird's-eye view image is associated with an annotated bird's-eye view image obtained by assigning an annotation to a three-dimensional object in the bird's-eye view image, a trained model by learning parameters of a machine learning model so that the trained model receives input of a bird's-eye view image to output a three-dimensional object in the bird's-eye view image.

12 Claims, 10 Drawing Sheets

2D IMAGE

BIRD'S-EYE VIEW CONVERSION

BIRD'S-EYE VIEW IMAGE

BIRD'S-EYE VIEW ANNOTATION IMAGE

(51) Int. Cl.

| | |
|---|---|
| *B60W 60/00* | (2020.01) |
| *G06N 20/00* | (2019.01) |
| *G06T 3/00* | (2024.01) |
| *G06V 10/774* | (2022.01) |
| *G06V 10/82* | (2022.01) |
| *G06V 20/56* | (2022.01) |
| *G06V 20/58* | (2022.01) |

(52) U.S. Cl.
 CPC ............ *G06V 10/774* (2022.01); *G06V 20/56* (2022.01); *B60W 2420/403* (2013.01); *B60W 2554/00* (2020.02); *G06N 20/00* (2019.01); *G06V 10/82* (2022.01); *G06V 20/58* (2022.01)

(58) Field of Classification Search
 CPC .......... B60W 2554/00; B60W 60/001; B60W 40/02; B60W 2420/403; G06T 3/00
 See application file for complete search history.

(56) References Cited

U.S. PATENT DOCUMENTS

| | | | |
|---|---|---|---|
| 9,141,870 | B2 | 9/2015 | Fukata et al. |
| 9,373,169 | B2 | 6/2016 | Varekamp et al. |
| 9,902,401 | B2 | 2/2018 | Stein et al. |
| 11,014,566 | B2 | 5/2021 | Maeda et al. |
| 11,567,197 | B2 | 1/2023 | Halder |
| 12,299,989 | B2 | 5/2025 | Taheri et al. |
| 2008/0205706 | A1 | 8/2008 | Hongo |
| 2009/0245582 | A1 | 10/2009 | Sakamoto |
| 2009/0295917 | A1 | 12/2009 | Zhang et al. |
| 2010/0134593 | A1 | 6/2010 | Kakinami |
| 2013/0222592 | A1 | 8/2013 | Gieseke |
| 2013/0322688 | A1 | 12/2013 | Tsuchiya et al. |
| 2014/0146176 | A1 | 5/2014 | Hayakawa et al. |
| 2015/0016681 | A1 | 1/2015 | Fukata et al. |
| 2015/0071490 | A1 | 3/2015 | Fukata et al. |
| 2016/0307054 | A1 | 10/2016 | Takemura et al. |
| 2017/0195567 | A1 | 7/2017 | Hsu et al. |
| 2018/0040153 | A1 | 2/2018 | Tanigawa et al. |
| 2018/0197022 | A1 | 7/2018 | Fujikawa |
| 2019/0025853 | A1* | 1/2019 | Julian .................... G06V 10/82 |
| 2019/0163993 | A1 | 5/2019 | Koo et al. |
| 2020/0074224 | A1 | 3/2020 | Hayashi et al. |
| 2020/0175315 | A1* | 6/2020 | Gowaikar ............. G01S 13/867 |
| 2021/0081681 | A1 | 3/2021 | Chiba et al. |
| 2021/0157006 | A1 | 5/2021 | Sun et al. |
| 2021/0240195 | A1 | 8/2021 | Atherton et al. |
| 2021/0402986 | A1 | 12/2021 | Imai et al. |
| 2022/0335725 | A1 | 10/2022 | Taheri et al. |
| 2023/0046410 | A1* | 2/2023 | Widjaja ............... G06V 20/182 |
| 2023/0071437 | A1 | 3/2023 | Kim et al. |
| 2023/0252804 | A1 | 8/2023 | Yasui et al. |
| 2023/0316539 | A1 | 10/2023 | Tanaka |
| 2024/0265715 | A1* | 8/2024 | Ho ......................... G06V 20/56 |
| 2025/0088751 | A1 | 3/2025 | Kurota et al. |

FOREIGN PATENT DOCUMENTS

| | | |
|---|---|---|
| CN | 107665603 | 2/2018 |
| CN | 109726692 | 5/2019 |
| CN | 111376895 | 7/2020 |
| CN | 113076830 | 7/2021 |
| JP | 04-163249 | 6/1992 |
| JP | 2008-219063 | 9/2008 |
| JP | 2019-139420 | 8/2019 |
| JP | 2019-211900 | 12/2019 |
| JP | 2020-035094 | 3/2020 |
| JP | 2020-083006 | 6/2020 |
| JP | 2021-082296 | 5/2021 |
| JP | 2021-117725 | 8/2021 |
| JP | 2021-162926 | 10/2021 |
| JP | 2021-189917 | 12/2021 |
| JP | 2022-014673 | 1/2022 |
| JP | 7224682 | 2/2023 |
| JP | 2023-115574 | 8/2023 |
| JP | 2023-152109 | 10/2023 |
| KR | 10-1797750 | 12/2017 |
| WO | 2012/115009 | 8/2012 |
| WO | 2013/018672 | 2/2013 |
| WO | 2018/146997 | 8/2018 |

OTHER PUBLICATIONS

Japanese Office Action for Japanese Patent Application No. 2022-019789 mailed Nov. 21, 2023.

Non-Final Office Action for U.S. Appl. No. 18/106,589 mailed Feb. 27, 2025.

Final Office Action for U.S. Appl. No. 18/106,589 mailed Oct. 6, 2025.

Chinese Office Action for Chinese Patent Application No. 202310100325.6 mailed Nov. 26, 2025.

Chinese Office Action for Chinese Patent Application No. 202310091495.2 mailed Dec. 8, 2025.

Non-Final Office Action for U.S. Appl. No. 18/106,589 mailed Jan. 30, 2026.

* cited by examiner

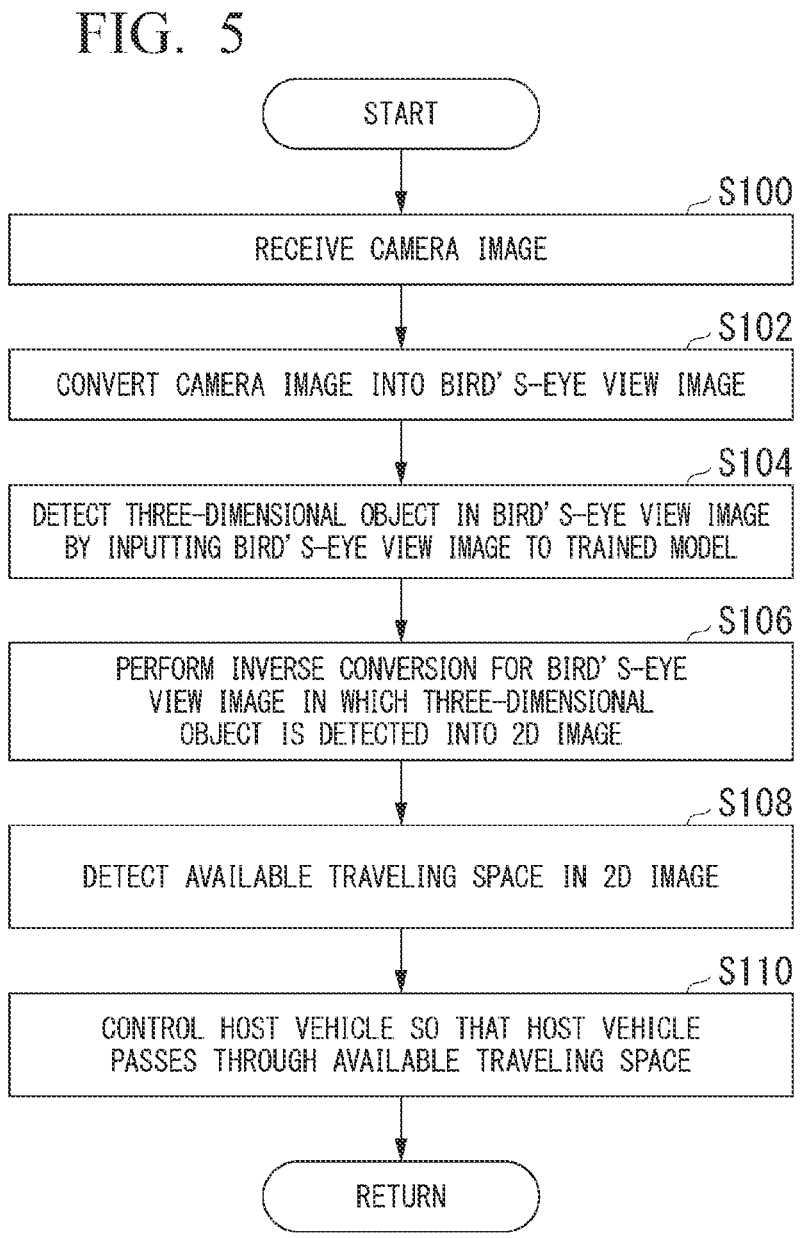

START

S100
RECEIVE CAMERA IMAGE

S102
CONVERT CAMERA IMAGE INTO BIRD'S-EYE VIEW IMAGE

S104
DETECT THREE-DIMENSIONAL OBJECT IN BIRD'S-EYE VIEW IMAGE
BY INPUTTING BIRD'S-EYE VIEW IMAGE TO TRAINED MODEL

S106
PERFORM INVERSE CONVERSION FOR BIRD'S-EYE
VIEW IMAGE IN WHICH THREE-DIMENSIONAL
OBJECT IS DETECTED INTO 2D IMAGE

S108
DETECT AVAILABLE TRAVELING SPACE IN 2D IMAGE

S110
CONTROL HOST VEHICLE SO THAT HOST VEHICLE
PASSES THROUGH AVAILABLE TRAVELING SPACE

RETURN

FIG. 7

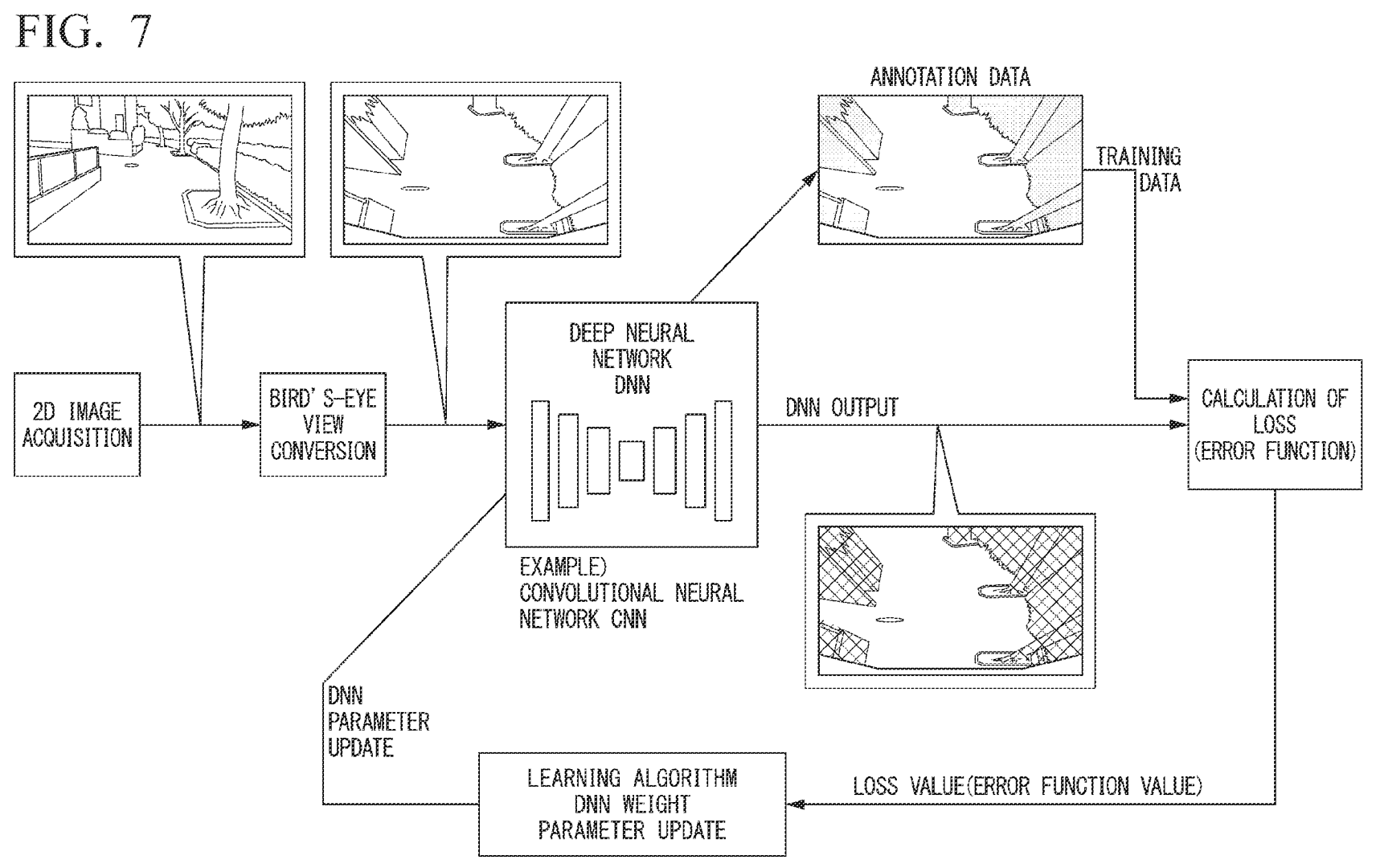

CALCULATION OF LOSS (ERROR FUNCTION)

TRAINING DATA

ANNOTATION DATA

DNN OUTPUT

DEEP NEURAL NETWORK DNN

EXAMPLE) CONVOLUTIONAL NEURAL NETWORK CNN

BIRD'S-EYE VIEW CONVERSION

2D IMAGE ACQUISITION

LOSS VALUE(ERROR FUNCTION VALUE)

LEARNING ALGORITHM DNN WEIGHT PARAMETER UPDATE

DNN PARAMETER UPDATE

START

S200
RECEIVE CAMERA IMAGE

S202
CONVERT CAMERA IMAGE INTO BIRD'S-EYE VIEW IMAGE

S204
DETECT THREE-DIMENSIONAL OBJECT IN 2D IMAGE
BY INPUTTING CAMERA IMAGE AND BIRD'S-EYE VIEW
IMAGE TO TRAINED MODEL

S206
DETECT AVAILABLE TRAVELING SPACE IN 2D IMAGE

S208
CONTROL HOST VEHICLE SO THAT HOST VEHICLE
PASSES THROUGH AVAILABLE TRAVELING SPACE

RETURN

LEARNING METHOD, LEARNING DEVICE, MOBILE OBJECT CONTROL DEVICE, MOBILE OBJECT CONTROL METHOD, AND STORAGE MEDIUM

CROSS-REFERENCE TO RELATED APPLICATION

Priority is claimed on Japanese Patent Application No. 2022-017870, filed Feb. 8, 2022, the content of which is incorporated herein by reference.

BACKGROUND

Field of the Invention

The present invention relates to a learning method, a learning device, a mobile object control device, a mobile object control method, and a storage medium.

Description of Related Art

In the related art, technology for detecting an obstacle located near a mobile object using a sensor mounted in the mobile object is known. For example, Japanese Unexamined Patent Application, First Publication No. 2021-162926 discloses technology for detecting an obstacle located near a mobile object on the basis of information acquired by a plurality of ranging sensors mounted in the mobile object.

In the technology described in Japanese Unexamined Patent Application, First Publication No. 2021-162926, an obstacle located near a mobile object is detected using a plurality of ranging sensors such as an ultrasonic sensor and a light detection and ranging (LIDAR) sensor. However, when a configuration using a plurality of ranging sensors is adopted, a hardware configuration for sensing becomes complicated and therefore system costs tend to increase due to the complicated hardware configuration for sensing. On the other hand, adopting a simple hardware configuration using only the camera to suppress system costs is also conceivable. However, in this case, a huge amount of training data for sensing is required to ensure robustness for coping with various scenes.

SUMMARY

The present invention has been made in consideration of such circumstances and an objective of the present invention is to provide a learning method, a learning device, a mobile object control device, a mobile object control method, and a storage medium capable of detecting a space where a mobile object can travel on the basis of a smaller amount of data without complicating a hardware configuration for sensing.

A learning method, a learning device, a mobile object control device, a mobile object control method, and a storage medium according to the present invention adopt the following configurations.

(1): According to an aspect of the present invention, there is provided a learning method including steps of: associating, with an extended area in a bird's-eye view image, an annotation indicating that the extended area is a three-dimensional object; and generating, based on training data in which a bird's-eye view image is associated with an annotated bird's-eye view image obtained by assigning an annotation to a three-dimensional object in the bird's-eye view image, a trained model by learning parameters of a machine learning model so that the trained model receives input of a bird's-eye view image to output a three-dimensional object in the bird's-eye view image.

(2): According to an aspect of the present invention, there is provided a learning device including: a storage medium storing computer-readable instructions; and a processor connected to the storage medium, wherein the processor executes the computer-readable instructions to: receive association of an extended area in a bird's-eye view image with an annotation indicating that the extended area is a three-dimensional object, and generate, based on training data in which a bird's-eye view image is associated with an annotated bird's-eye view image obtained by assigning an annotation to a three-dimensional object in the bird's-eye view image, a trained model by learning parameters of a machine learning model so that the trained model receives input of a bird's-eye view image to output a three-dimensional object in the bird's-eye view image.

(3): According to an aspect of the present invention, there is provided a storage medium storing a program for causing a computer to: receive association of an extended area in a bird's-eye view image with an annotation indicating that the extended area is a three-dimensional object, and generate, based on training data in which a bird's-eye view image is associated with an annotated bird's-eye view image obtained by assigning an annotation to a three-dimensional object in the bird's-eye view image, a trained model by learning parameters of a machine learning model so that the trained model receives input of a bird's-eye view image to output a three-dimensional object in the bird's-eye view image.

(4): According to an aspect of the present invention, there is provided a mobile object control device including: a storage medium storing computer-readable instructions; and a processor connected to the storage medium, wherein the processor executes the computer-readable instructions to: acquire a target bird's-eye view image by converting an image obtained by imaging surroundings of a mobile object using a camera mounted in the mobile object into a bird's-eye view coordinate system, detect a three-dimensional object in the target bird's-eye view image by inputting the target bird's-eye view image to the trained model according to the aspect (1), detect an available traveling space of the mobile object on the basis of the detected three-dimensional object, and cause the mobile object to travel so that the mobile object passes through the available traveling space.

(5): According to an aspect of the present invention, there is provided a mobile object control method including: acquiring, by a computer, a target bird's-eye view image by converting an image obtained by imaging surroundings of a mobile object using a camera mounted in the mobile object into a bird's-eye view coordinate system; detecting, by the computer, a three-dimensional object in the target bird's-eye view image by inputting the target bird's-eye view image to the trained model according to the aspect (1); detecting, by the computer, an available traveling space of the mobile object on the basis of the detected three-dimensional object; and causing, by the computer, the mobile object to travel so that the mobile object passes through the available traveling space.

(6): According to an aspect of the present invention, there is provided a computer-readable non-transitory storage medium storing a program for causing a computer to: acquire a target bird's-eye view image by converting an image obtained by imaging surroundings of a mobile object using a camera mounted in the mobile object into a bird's-eye view coordinate system, detect a three-dimensional object in the target bird's-eye view image by inputting the target bird's-eye view image to the trained model according to the aspect (1), detect an available traveling space of the mobile object on the basis of the detected three-dimensional object, and cause the mobile object to travel so that the mobile object passes through the available traveling space.

(7): According to an aspect of the present invention, there is provided a learning method including steps of: associating, with an extended area in a bird's-eye view image, an annotation indicating that the extended area is a three-dimensional object; and generating, based on training data in which an image and a bird's-eye view image obtained by converting the image into a bird's-eye view coordinate system are associated with an image obtained by performing an inverse bird's-eye view conversion process for an annotated bird's-eye view image obtained by assigning an annotation to a three-dimensional object in the bird's-eye view image, a trained model by learning parameters of a machine learning model so that the trained model receives input of an image and a bird's-eye view image obtained by converting the image into a bird's-eye view coordinate system to output a three-dimensional object in the image.

(8): According to an aspect of the present invention, there is provided a learning device including: a storage medium storing computer-readable instructions; and a processor connected to the storage medium, wherein the processor executes the computer-readable instructions to: receive association of an extended area in a bird's-eye view image with an annotation indicating that the extended area is a three-dimensional object, and generate, based on training data in which an image and a bird's-eye view image obtained by converting the image into a bird's-eye view coordinate system are associated with an image obtained by performing an inverse bird's-eye view conversion process for an annotated bird's-eye view image obtained by assigning an annotation to a three-dimensional object in the bird's-eye view image, a trained model by learning parameters of a machine learning model so that the trained model receives input of an image and a bird's-eye view image obtained by converting the image into a bird's-eye view coordinate system to output a three-dimensional object in the image.

(9): According to an aspect of the present invention, there is provided a computer-readable non-transitory storage medium storing a program for causing a computer to: receive association of an extended area in a bird's-eye view image with an annotation indicating that the extended area is a three-dimensional object, and generate, based on training data in which an image and a bird's-eye view image obtained by converting the image into a bird's-eye view coordinate system are associated with an image obtained by performing an inverse bird's-eye view conversion process for an annotated bird's-eye view image obtained by assigning an annotation to a three-dimensional object in the bird's-eye view image, a trained model by learning parameters of a machine learning model so that the trained model receives input of an image and a bird's-eye view image obtained by converting the image into a bird's-eye view coordinate system to output a three-dimensional object in the image.

(10): According to an aspect of the present invention, there is provided a mobile object control device including: a storage medium storing computer-readable instructions; and a processor connected to the storage medium, wherein the processor executes the computer-readable instructions to: acquire a target bird's-eye view image by converting a target image obtained by imaging surroundings of a mobile object using a camera mounted in the mobile object into a bird's-eye view coordinate system, detect a three-dimensional object in the target image by inputting the target image and the target bird's-eye view image to the trained model according to the aspect (7), detect an available traveling space of the mobile object on the basis of the detected three-dimensional object, and cause the mobile object to travel so that the mobile object passes through the available traveling space.

(11): According to an aspect of the present invention, there is provided a mobile object control method including: acquiring, by a computer, a target bird's-eye view image by converting a target image obtained by imaging surroundings of a mobile object using a camera mounted in the mobile object into a bird's-eye view coordinate system; detecting, by the computer, a three-dimensional object in the target image by inputting the target image and the target bird's-eye view image to the trained model according to the aspect (7); detecting, by the computer, an available traveling space of the mobile object on the basis of the detected three-dimensional object; and causing, by the computer, the mobile object to travel so that the mobile object passes through the available traveling space.

(12): According to an aspect of the present invention, there is provided a computer-readable non-transitory storage medium storing a program for causing a computer to: acquire a target bird's-eye view image by converting a target image obtained by imaging surroundings of a mobile object using a camera mounted in the mobile object into a bird's-eye view coordinate system, detect a three-dimensional object in the target image by inputting the target image and the target bird's-eye view image to the trained model according to the aspect (7), detect an available traveling space of the mobile object on the basis of the detected three-dimensional object, and cause the mobile object to travel so that the mobile object passes through the available traveling space.

According to the aspects (1) to (12), it is possible to detect a space where a mobile object can travel on the basis of a smaller amount of data without complicating a hardware configuration for sensing.

BRIEF DESCRIPTION OF THE DRAWINGS

FIG. 3 is a diagram showing an example of a three-dimensional object detection result of a three-dimensional object detection unit.

FIG. 4 is a diagram showing an example of an available traveling space FS detected by a space detection unit.

FIG. 5 is a flowchart showing an example of a flow of a process executed by the mobile object control device.

FIG. 7 is a diagram for describing details of machine learning performed by a learning unit.

FIG. 8 is a diagram for describing details of machine learning performed by a learning unit according to the present modified example.

FIG. 9 is a diagram showing an example of a three-dimensional object detection result of a three-dimensional object detection unit according to the present modified example.

DESCRIPTION OF EMBODIMENTS

Hereinafter, embodiments of a learning method, a learning device, a mobile object control device, a mobile object control method, and a storage medium of the present invention will be described with reference to the drawings. The mobile object control device is a device for controlling a moving operation of a mobile object. Examples of the mobile object may include a vehicle such as a three- or four-wheeled vehicle, a motorcycle, a micro-mobility, or the like and may include any mobile object capable of moving along a road surface. In the following description, it is assumed that the mobile object is a four-wheeled vehicle and a vehicle in which a driving assistance device is mounted is referred to as a host vehicle M.

[Mobile Object Control Device]

Figure 1:
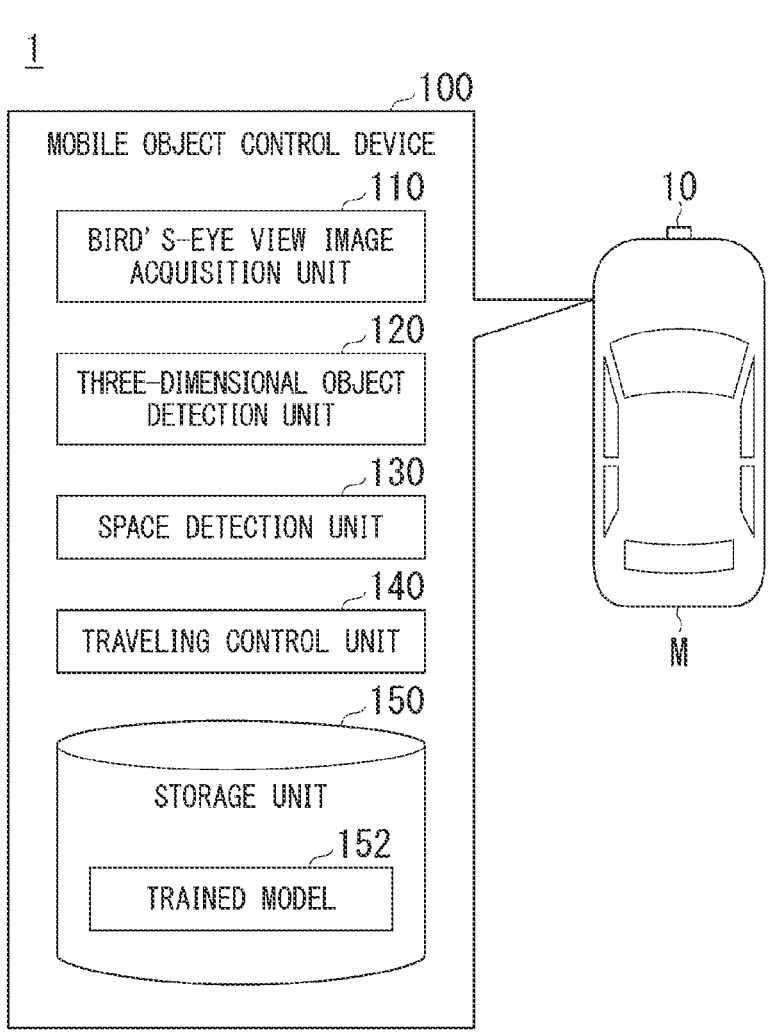
FIG. 1 is a diagram showing an example of a configuration of a host vehicle M including a mobile object control device according to an embodiment of the present invention.

FIG. 1 is a diagram showing an example of a configuration of a host vehicle M including a mobile object control device 100 according to the embodiment of the present invention. As shown in FIG. 1, the host vehicle M includes a camera 10 and the mobile object control device 100. The camera 10 and the mobile object control device 100 are connected to each other through a multiplex communication line such as a controller area network (CAN) communication line, a serial communication line, or a wireless communication network. Also, the configuration shown in FIG. 1 is only an example and another configuration may be further added.

For example, the camera 10 is a digital camera using a solid-state imaging element such as a charge coupled device (CCD) or a complementary metal oxide semiconductor (CMOS). Although the camera 10 is installed on a front bumper of the host vehicle M in FIG. 1, it is only necessary to generally install the camera 10 at any location where the front of the host vehicle M can be imaged, such as, for example, the cabin of the host vehicle M. For example, the camera 10 periodically and iteratively images the surroundings of the host vehicle M. The camera 10 may be a stereo camera.

The mobile object control device 100 includes, for example, a bird's-eye view image acquisition unit 110, a three-dimensional object detection unit 120, a space detection unit 130, a traveling control unit 140, and a storage unit 150. The storage unit 150 stores, for example, a trained model 152. Each of the bird's-eye view image acquisition unit 110, the three-dimensional object detection unit 120, the space detection unit 130, and the traveling control unit 140 is implemented, for example, by a hardware processor such as a central processing unit (CPU) executing a program (software). Some or all of the above components may be implemented by hardware (including a circuit; circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be prestored in a storage device (a storage device including a non-transitory storage medium) such as a hard disk drive (HDD) or a flash memory or may be stored in a removable storage medium (the non-transitory storage medium) such as a digital video disc (DVD) or a compact disc (CD)-read only memory (ROM) and installed when the storage medium is mounted in a drive device. The storage unit 150 is implemented by, for example, a ROM, a flash memory, a secure digital (SD) card, a random access memory (RAM), an HDD, a register, or the like.

Figure 2:
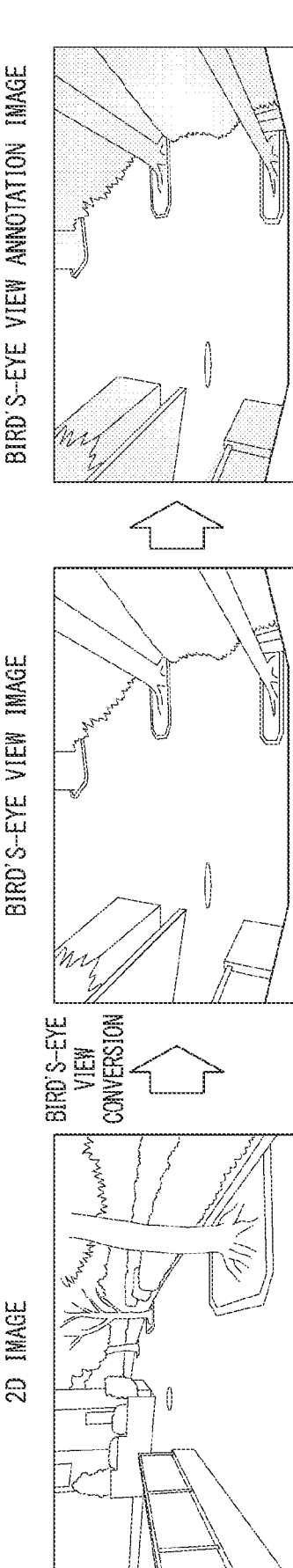
FIG. 2 is a diagram showing an example of a bird's-eye view image acquired by a bird's-eye view image acquisition unit.

The bird's-eye view image acquisition unit 110 acquires a bird's-eye view image by converting an image obtained by imaging a surrounding situation of the host vehicle M using the camera 10 into a bird's-eye view coordinate system. FIG. 2 is a diagram showing an example of the bird's-eye view image acquired by the bird's-eye view image acquisition unit 110. The left part of FIG. 2 shows the image captured by the camera 10 and the central part of FIG. 2 shows the bird's-eye view image obtained by converting the image captured using the camera 10 into the bird's-eye view coordinate system. As shown in FIG. 2, a three-dimensional object shown in a 2D image is shown as an extended area extended in an upward/downward direction or a left/right direction by performing conversion into a bird's-eye view image, unlike a road surface or the like. As will be described below and as shown in the right part of FIG. 2, a creator of the trained model 152 prepares training data 252 for a learning process of the learning device 200 by associating an annotation indicating that the extended area is a three-dimensional object with the extended area shown in the bird's-eye view image using the learning device 200.

Figure 3:
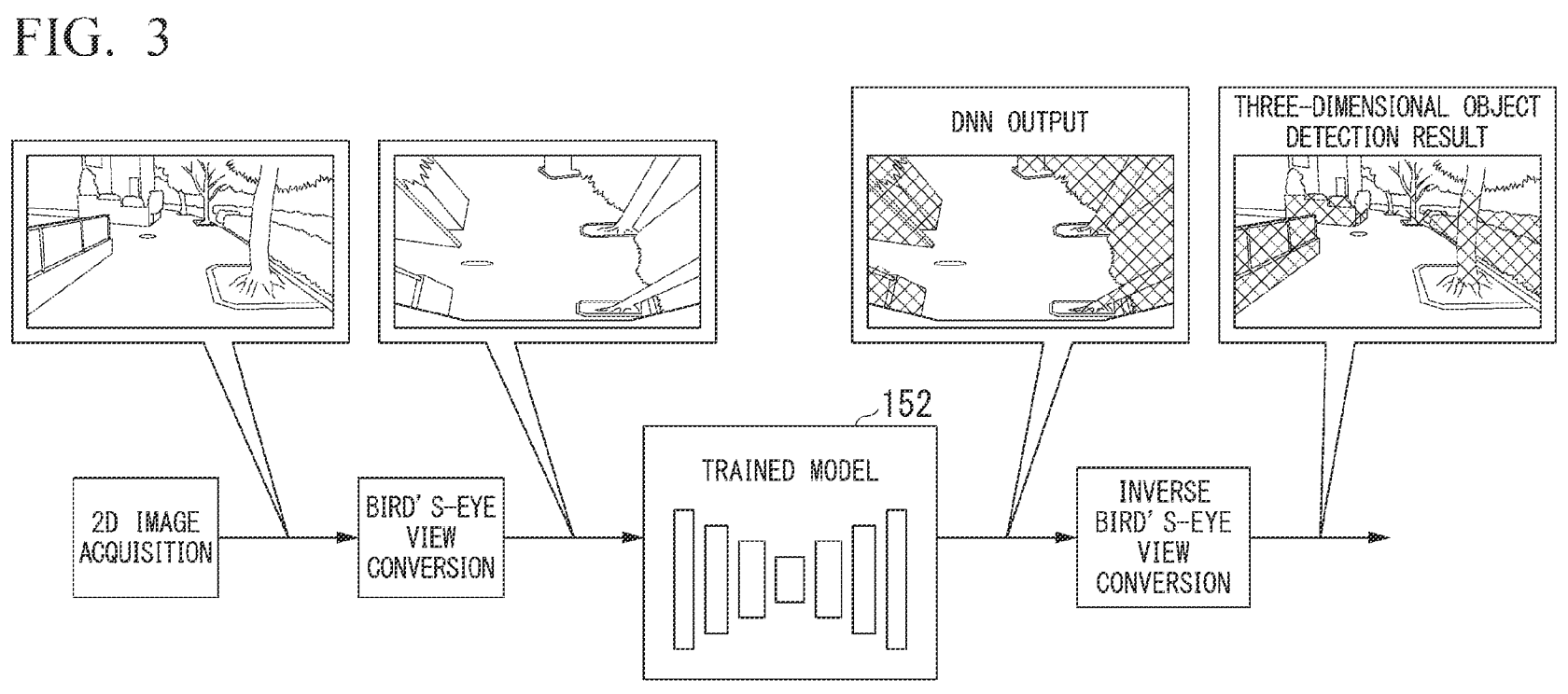

The three-dimensional object detection unit 120 detects a three-dimensional object in the bird's-eye view image after the conversion by inputting the bird's-eye view image after the conversion to the trained model 152 trained to output the three-dimensional object in the bird's-eye view image when the bird's-eye view image is input. FIG. 3 is a diagram showing an example of a three-dimensional object detection result of the three-dimensional object detection unit 120. As shown in FIG. 3, when the three-dimensional object detection unit 120 inputs the bird's-eye view image after the conversion to the trained model 152, the trained model 152 outputs the bird's-eye view image (i.e., outputs the three-dimensional object) in the format in which the three-dimensional object included in the bird's-eye view image can be identified. The three-dimensional object detection unit 120 can detect the three-dimensional object shown in the bird's-eye view image with reference to the bird's-eye view image output by the trained model 152.

The space detection unit 130 performs an inverse bird's-eye view conversion process for the bird's-eye view image output by the trained model 152 and obtains a 2D image displayed in the format in which a three-dimensional object can be identified. The space detection unit 130 detects a space where the host vehicle M can travel (hereinafter referred to as an available traveling space FS) in the 2D image by excluding the identified three-dimensional object from the 2D image that has been obtained.

Figure 4:
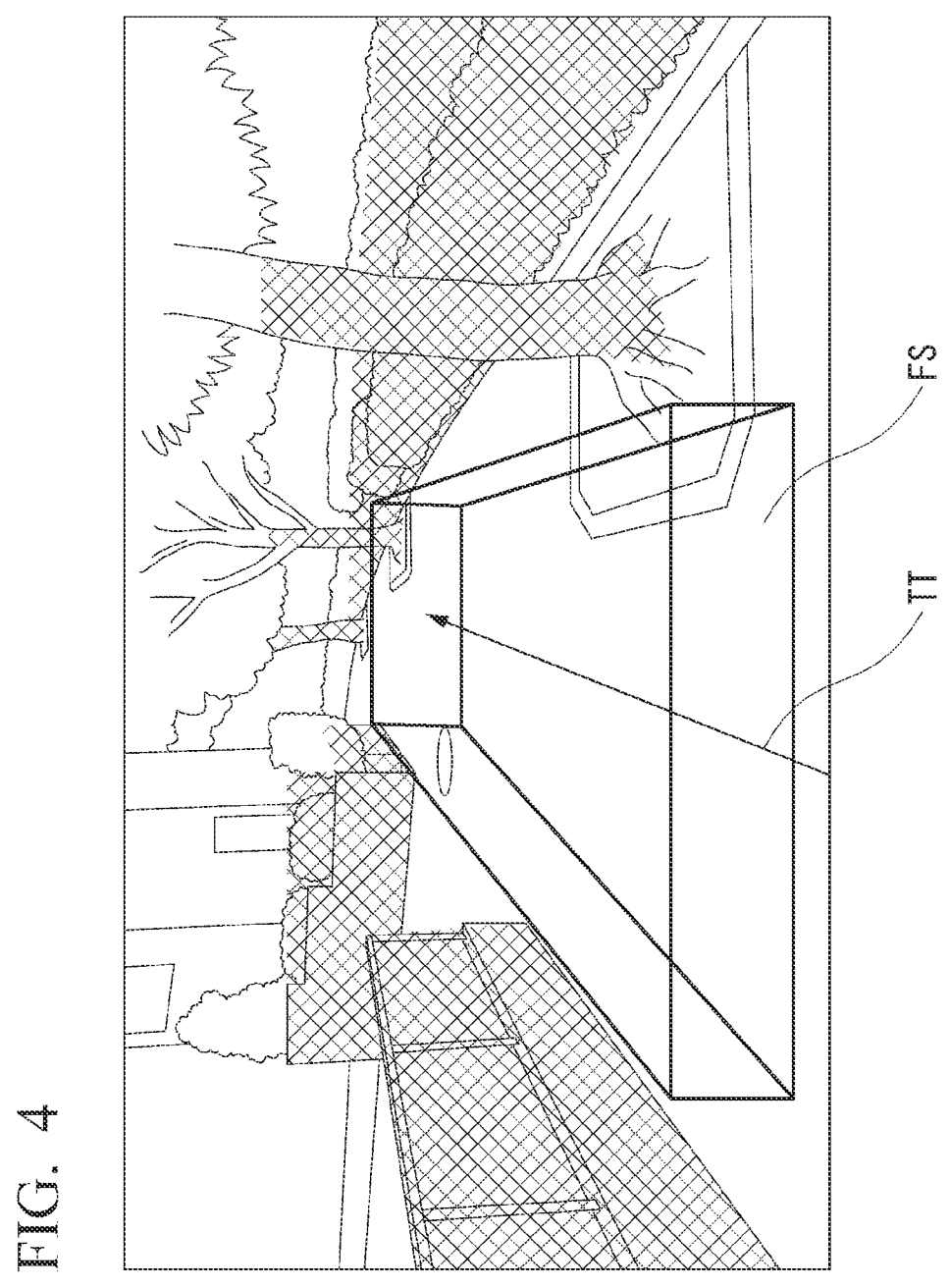

FIG. 4 is a diagram showing an example of the available traveling space FS detected by the space detection unit 130. In FIG. 4, the available traveling space FS is shown as a rectangular parallelepiped area as an example. The traveling control unit 140 generates a target trajectory TT so that the host vehicle M passes through the available traveling space FS and causes the host vehicle M to travel along the target trajectory TT. The target trajectory TT includes, for example, a speed element. For example, the target trajectory is represented by sequentially arranging points (trajectory points) at which the host vehicle M is required to arrive. The trajectory points are points at which the host vehicle M is required to arrive for each prescribed traveling distance (for example, about several meters [m]) along a road. In addition, a target speed and target acceleration for each prescribed sampling time (for example, about several tenths of a second [sec]) are generated as parts of the target trajectory. The trajectory point may be a position at which the host vehicle M is required to arrive at the sampling time for each prescribed sampling time. In this case, information of the target speed or the target acceleration is represented by an interval between the trajectory points. Although a case where the present invention is applied to automated driving is described as an example in the present embodiment, the present invention is not limited to such a configuration. The present invention may be applied to driving assistance for displaying the available traveling space FS where there is no three-dimensional object on the navigation device of the host vehicle M or assisting in operating the steering wheel so that the host vehicle M travels in the available traveling space FS or the like.

Next, a flow of a process executed by the mobile object control device 100 will be described with reference to FIG. 5. FIG. 5 is a flowchart showing an example of the flow of the process executed by the mobile object control device 100. First, the mobile object control device 100 acquires a camera image obtained by imaging a surrounding situation of the host vehicle M using the camera 10 (step S100). Subsequently, the bird's-eye view image acquisition unit 110 acquires a bird's-eye view image by converting the acquired camera image into a bird's-eye view coordinate system (step S102).

Subsequently, the three-dimensional object detection unit 120 detects a three-dimensional object in the bird's-eye view image by inputting the acquired bird's-eye view image to the trained model 152 (step S104). Subsequently, the space detection unit 130 performs an inverse bird's-eye view conversion process for the bird's-eye view image in which the three-dimensional object is detected and obtains a 2D image in which the three-dimensional object is displayed in the format in which the three-dimensional object can be recognized (step S106).

Subsequently, the space detection unit 130 detects the available traveling space FS in the 2D image by excluding the identified three-dimensional object from the obtained 2D image (step S108). Subsequently, the space detection unit 130 generates the target trajectory TT so that the host vehicle M passes through the available traveling space FS and causes the host vehicle M to travel along the target trajectory TT (step S110). Thereby, the process of the present flowchart ends.

[Learning Device]

Figure 6:
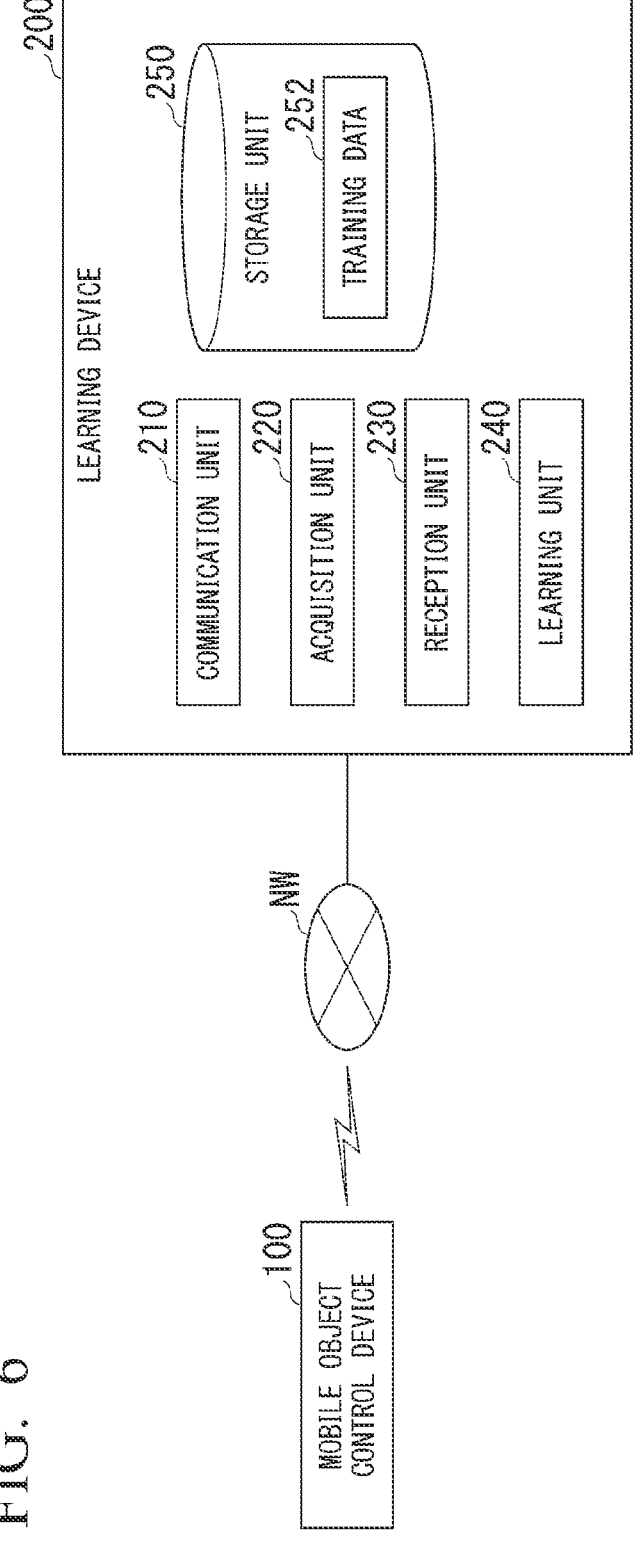
FIG. 6 is a diagram showing an example of a configuration of a learning device.

Next, the learning device 200 that generates the trained model 152 of the present embodiment will be described with reference to FIG. 6. FIG. 6 is a diagram showing an example of a configuration of the learning device 200. As shown in FIG. 6, the learning device 200 includes, for example, a communication unit 210, an acquisition unit 220, a reception unit 230, a learning unit 240, and a storage unit 250. For example, the storage unit 250 stores the training data 252. Each of the acquisition unit 220, the reception unit 230, and the learning unit 240 is implemented, for example, by a hardware processor such as a CPU executing a program (software). Some or all of the above components may be implemented by hardware (including a circuit; circuitry) such as an LSI circuit, an ASIC, an FPGA, or a GPU or may be implemented by software and hardware in cooperation. The program may be prestored in a storage device (a storage device including a non-transitory storage medium) such as an HDD or a flash memory or may be stored in a removable storage medium (the non-transitory storage medium) such as a DVD or a CD-ROM and installed when the storage medium is mounted in a drive device. The storage unit 250 is implemented by, for example, a ROM, a flash memory, an SD card, a RAM, a HDD, a register, or the like.

The communication unit 210 is an interface that communicates with the mobile object control device 100 of the host vehicle M via the network NW. The communication unit 210 includes, for example, a network interface card (NIC), an antenna for wireless communication, and the like.

The acquisition unit 220 acquires a bird's-eye view image from the vehicle via, for example, the communication unit 210. In this case, a vehicle, which is an image providing source, may be a vehicle for exclusively collecting images. Also, the learning device 200 does not necessarily need to communicate with the vehicle via the network NW, and the data collected by the vehicle may be stored in a portable storage medium, carried by a person, and used for learning. Furthermore, alternatively, the acquisition unit 220 may acquire a camera image from the vehicle and the learning device 200 may convert the acquired camera image into the bird's-eye view image.

The reception unit 230 receives the association of the annotation indicating that an extended area in the bird's-eye view image is a three-dimensional object with the extended area and stores the received association as the training data 252 in which the extended area in the bird's-eye view image and the annotation are associated in the storage unit 250. In other words, the training data 252 is a dataset in which an annotated bird's-eye view image obtained by assigning the annotation to the three-dimensional object in the bird's-eye view image is associated with the bird's-eye view image. Specifically, for example, the reception unit 230 may provide a creator of the trained model 152 with an interface screen for assigning the annotation to the three-dimensional object in the bird's-eye view image and receive a combination of the bird's-eye view image and the annotated bird's-eye view as the training data 252 by receiving an operation from the creator. Also, for example, the reception unit 230 may receive the annotated bird's-eye view image created by the creator of the trained model 152 together with the bird's-eye view image that is the original data of the annotated bird's-eye view image from a terminal device of the creator.

The learning unit 240 generates the trained model 152 by learning parameters of a machine learning model so that the three-dimensional object in the bird's-eye view image is output when the bird's-eye view image is input on the basis of the training data 252. The learning unit 240 transmits the trained model 152, which has been generated, to the mobile object control device 100 via the network NW and the mobile object control device 100 stores the trained model 152, which has been received, in the storage unit 150.

FIG. 7 is a diagram for describing details of the machine learning performed by the learning unit 240. As shown in FIG. 7, the learning unit 240 updates parameters of a deep neural network (DNN) such as a convolutional neural network (CNN) so that a value of an error function indicating a difference between an output image output as a result of inputting a bird's-eye view image to the DNN and an annotated bird's-eye view image corresponding to the bird's-eye view image is reduced. As a method for the learning unit 240 to update the parameters of the DNN, any method such as a back propagation method, a steepest descent method, or a stochastic gradient descent method can be used. The error function is, for example, any function such as sum-of-squares error or cross-entropy. The learning unit 240 determines the parameters of the DNN by executing parameter update processes equal in number to datasets stored in the training data 252 and obtains the trained model 152.

According to the embodiment as described above, the learning device 200 generates the trained model 152 trained to output a three-dimensional object in the bird's-eye view image when the bird's-eye view image is input and the mobile object control device 100 recognizes a three-dimensional object by converting an image captured using the camera 10 into a bird's-eye view image and inputting the bird's-eye view image after the conversion to the trained model 152 that has been generated. Thereby, the available traveling space of the mobile object can be detected on the basis of a smaller amount of learning data without complicating the hardware configuration for sensing.

Modified Examples

In the above-described embodiment, the learning device 200 generates a trained model 152 trained to output a three-dimensional object in a bird's-eye view image when the bird's-eye view image is input and the mobile object control device 100 detects the three-dimensional object located in front of the host vehicle M using the trained model 152 that has been generated. However, the present invention is not limited to such configurations. In the present modified example, the learning device 200 generates the trained model 152 trained to output a three-dimensional object in an image when the image and a bird's-eye view image obtained by converting the image into a bird's view coordinate system are input and the mobile object control device 100 detects the three-dimensional object located in front of the host vehicle M using the trained model 152 that has been generated. Because the configurations of the mobile object control device 100 and the learning device 200 are similar to those in the above-described embodiment, description thereof is omitted.

Figure 8:
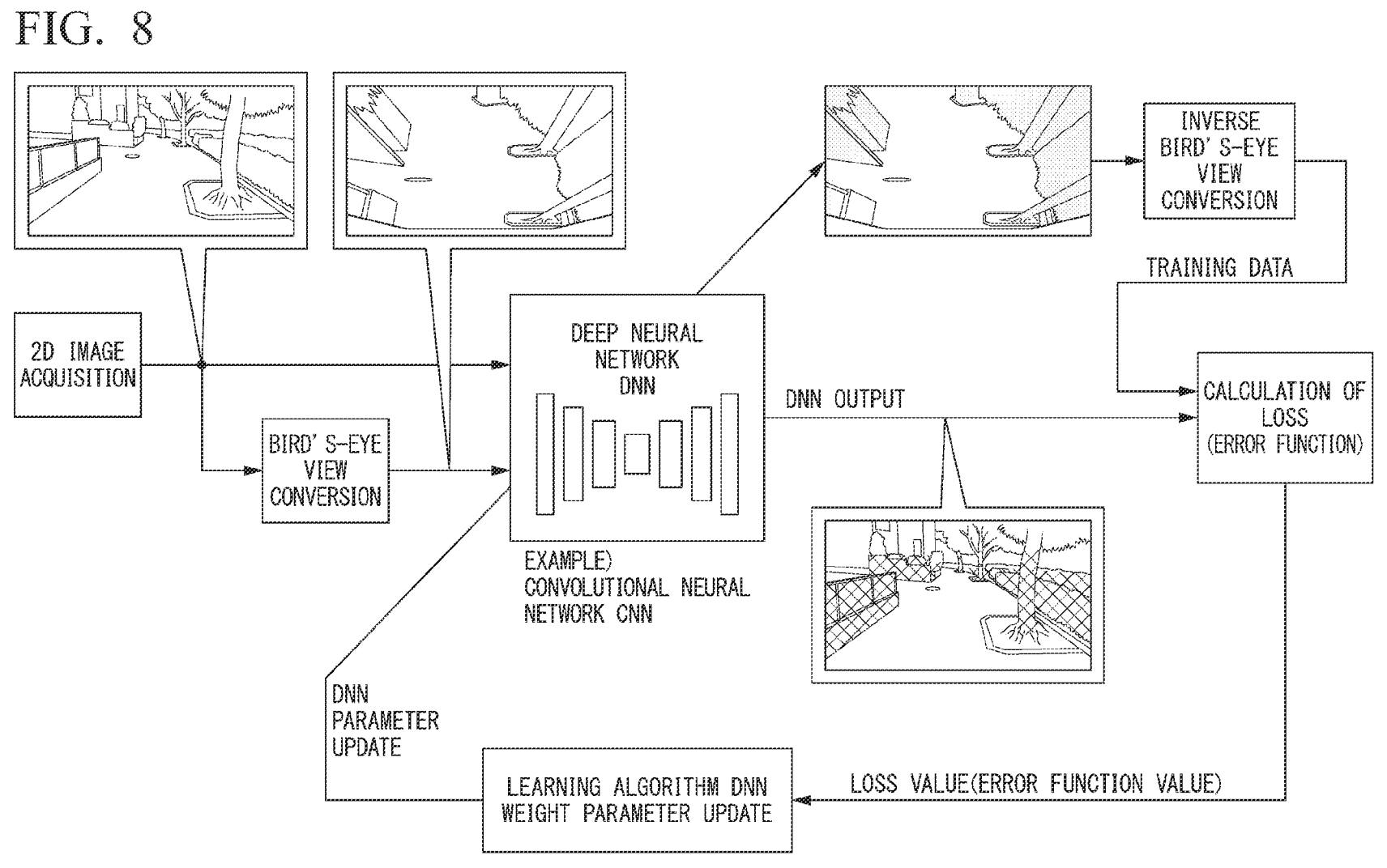

FIG. 8 is a diagram for describing details of the machine learning performed by the learning unit 240 according to the present modified example. As shown in FIG. 8, the learning unit 240 updates parameters of a DNN such as a CNN so that a value of an error function indicating a difference between an output image output as a result of inputting an image and a bird's-eye view image obtained by converting the image into a bird's-eye view coordinate system to the DNN and an image obtained by performing an inverse bird's view conversion process for an annotated bird's-eye view image corresponding to the bird's-eye view image is reduced. A DNN parameter update method and a type of error function are similar to those of the above-described embodiment. The learning unit 240 determines the parameters of the DNN by executing parameter update processes equal in number to datasets stored in the training data 252 and obtains the trained model 152.

Figure 9:
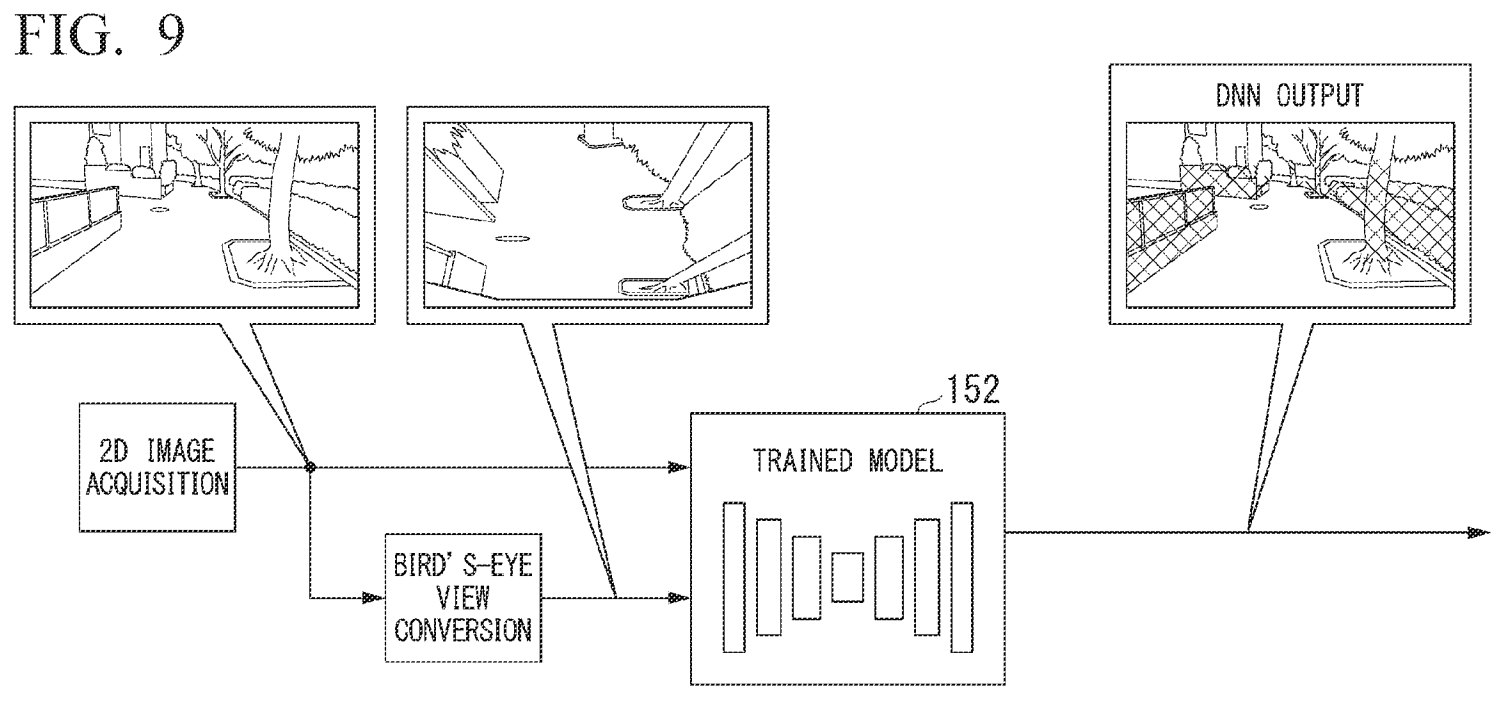

FIG. 9 is a diagram showing an example of a three-dimensional object detection result of the three-dimensional object detection unit 120 according to the present modified example. As shown in FIG. 9, when the three-dimensional object detection unit 120 inputs an image captured by the camera 10 and a bird's-eye view image obtained by converting the image into the bird's-eye view coordinate system to the trained model 152, the trained model 152 outputs a 2D image in the format that a three-dimensional object can be identified (i.e., outputs the three-dimensional object). The three-dimensional object detection unit 120 detects the three-dimensional object shown in the image with reference to the 2D image output by the trained model 152.

Figure 10:
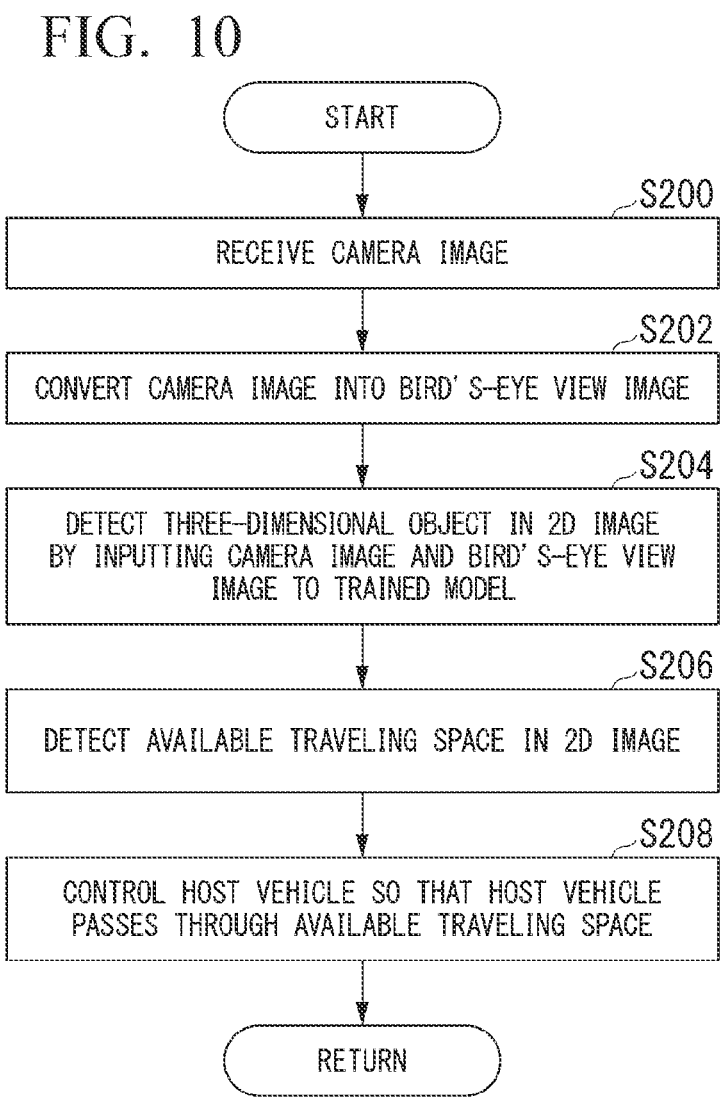
FIG. 10 is a flowchart showing an example of a flow of a process executed by a mobile object control device according to the present modified example.

Next, a flow of a process executed by the mobile object control device 100 according to the present modified example will be described with reference to FIG. 10. FIG. 10 is a flowchart showing an example of the flow of the process executed by the mobile object control device 100 according to the present modified example. First, the mobile object control device 100 acquires a camera image by imaging surroundings of the host vehicle M using the camera 10 (step S200). Subsequently, the bird's-eye view image acquisition unit 110 acquires a bird's-eye view image by converting the acquired camera image into a bird's-eye view coordinate system (step S202).

Subsequently, the three-dimensional object detection unit 120 detects a three-dimensional object in a 2D image by inputting the acquired camera image and bird's-eye view image to the trained model 152 (step S204). Subsequently, the space detection unit 130 detects an available traveling space FS in the 2D image by excluding the identified three-dimensional object from the 2D image that has been obtained (step S206). Subsequently, the space detection unit 130 generates a target trajectory TT so that the host vehicle M passes through the available traveling space FS and causes the host vehicle M to travel along the target trajectory TT (step S208). Thereby, the process of the present flowchart ends.

According to the present modified example as described above, the learning device 200 generates a trained model 152 trained to output a three-dimensional object in an 2D image when the 2D image and a bird's-eye view image obtained by converting the 2D image into a bird's-eye view coordinate system are input and the mobile object control device 100 recognizes a three-dimensional object in a camera image by inputting the camera image captured using the camera 10 and a bird's-eye view image obtained by converting the camera image into the bird's-eye view coordinate system to the trained model 152 that has been generated. Thereby, the available traveling space of the mobile object can be detected on the basis of a smaller amount of learning data without complicating the hardware configuration for sensing.

Furthermore, in the above-described embodiment, the mobile object control device 100 performs the inverse bird's-eye view conversion process for the bird's-eye view image output by the trained model 152. However, in the present modified example, the mobile object control device 100 can acquire a three-dimensional object detection result in the camera image without executing the inverse bird's-eye view conversion process by inputting the camera image captured using the camera 10 and the bird's-eye view image corresponding to the camera image to the trained model 152. Thereby, the processing load on the mobile object control device 100 can be reduced as compared with the above-described embodiment.

The above-described embodiment can be represented as follows.

A learning device including:

a storage device storing a program; and a hardware processor, wherein the hardware processor executes the program stored in the storage device to:

receive association of an annotation indicating that an extended area in a bird's-eye view image is a three-dimensional object with the extended area, and generate a trained model by learning parameters of a machine learning model so that the three-dimensional object in the bird's-eye view image is output when the bird's-eye view image is input on the basis of training data in which an annotated bird's-eye view image obtained by assigning the annotation to the three-dimensional object in the bird's-eye view image is associated with the bird's-eye view image.

Furthermore, the above-described embodiment can be represented as follows.

A learning device including:

a storage device storing a program; and a hardware processor, wherein the hardware processor executes the program stored in the storage device to:

receive association of an annotation indicating that an extended area in a bird's-eye view image is a three-dimensional object with the extended area; and generate a trained model by learning parameters of a machine learning model so that the three-dimensional object in an image is output when the image and the bird's-eye view image obtained by converting the image into a bird's-eye view coordinate system are input on the basis of training data in which an image obtained by performing an inverse bird's-eye view conversion process for an annotated bird's-eye view image obtained by assigning the annotation to the three-dimensional object in the bird's-eye view image is associated with the image and the bird's-eye view image obtained by converting the image into the bird's-eye view coordinate system.

Although modes for carrying out the present invention have been described above using embodiments, the present invention is not limited to the embodiments, and various modifications and substitutions can also be made without departing from the scope and spirit of the present invention.

What is claimed is:

1. A learning method executed by a computer comprising a processor and a memory, the learning method comprising:

associating, with an extended area in a bird's-eye view image, an annotation indicating that the extended area is a three-dimensional object, the extended area being extended due to conversion of a camera image capturing the area into the bird's-eye view image;

generating, based on training data in which a bird's-eye view image is associated with an annotated bird's-eye view image obtained by assigning an annotation to a three-dimensional object in the bird's-eye view image, a trained model by learning parameters of a machine learning model so that the trained model receives input of a bird's-eye view image and outputs a three-dimensional object in the bird's-eye view image; and causing a movement of a mobile object based on transmitting the trained model to the mobile object, wherein the trained model is stored in a storage of the mobile object.

2. A mobile object control device comprising:

a non-transitory computer-readable storage medium storing computer-readable instructions; and a processor connected to the non-transitory computer-readable storage medium, wherein the processor executes the computer-readable instructions to:

acquire a target bird's-eye view image by converting an image obtained by imaging surroundings of a mobile object using a camera mounted in the mobile object into a bird's-eye view coordinate system, detect a three-dimensional object in the target bird's-eye view image by inputting the target bird's-eye view image to the trained model according to claim 1,

detect an available traveling space of the mobile object on the basis of the detected three-dimensional object, and cause the mobile object to travel so that the mobile object passes through the available traveling space by generating a target trajectory and causing the mobile object to travel along the target trajectory by autonomous driving, or provide assistance for operation of a steering wheel of the mobile object so as to pass through the available traveling space.

3. A mobile object control method executed by a computer comprising a processor and a memory, the mobile object control method comprising:

acquiring, by the computer, a target bird's-eye view image by converting an image obtained by imaging surroundings of a mobile object using a camera mounted in the mobile object into a bird's-eye view coordinate system;

detecting, by the computer, a three-dimensional object in the target bird's-eye view image by inputting the target bird's-eye view image to the trained model according to claim 1;

detecting, by the computer, an available traveling space of the mobile object on the basis of the detected three-dimensional object; and causing, by the computer, the mobile object to travel so that the mobile object passes through the available traveling space by generating a target trajectory and causing the mobile object to travel along the target trajectory by autonomous driving, or provide assistance for operation of a steering wheel of the mobile object so as to pass through the available traveling space.

4. A non-transitory computer readable storage medium storing a program thereon, the program causing a computer to:

acquire a target bird's-eye view image by converting an image obtained by imaging surroundings of a mobile object using a camera mounted in the mobile object into a bird's-eye view coordinate system, detect a three-dimensional object in the target bird's-eye view image by inputting the target bird's-eye view image to the trained model according to claim 1, detect an available traveling space of the mobile object on the basis of the detected three-dimensional object, and cause the mobile object to travel so that the mobile object passes through the available traveling space by generating a target trajectory and causing the mobile object to travel along the target trajectory by autonomous driving, or provide assistance for operation of a steering wheel of the mobile object so as to pass through the available traveling space.

5. A learning device comprising:

a non-transitory computer-readable storage medium storing computer-readable instructions; and a processor connected to the non-transitory computer-readable storage medium, wherein the processor executes the computer-readable instructions to:

receive association of an extended area in a bird's-eye view image with an annotation indicating that the extended area is a three-dimensional object, the extended area being extended due to conversion of a camera image capturing the area into the bird's-eye view image;

generate, based on training data in which a bird's-eye view image is associated with an annotated bird's-eye view image obtained by assigning an annotation to a three-dimensional object in the bird's-eye view image, a trained model by learning parameters of a machine learning model so that the trained model receives input of a bird's-eye view image and outputs a three-dimensional object in the bird's-eye view image; and cause a movement of a mobile object based on transmitting the trained model to the mobile object, wherein the trained model is stored in a storage of the mobile object.

6. A non-transitory computer readable storage medium storing a program thereon, the program causing a computer to:

receive association of an extended area in a bird's-eye view image with an annotation indicating that the extended area is a three-dimensional object, the extended area being extended due to conversion of a camera image capturing the area into the bird's-eye view image, generate, based on training data in which a bird's-eye view image is associated with an annotated bird's-eye view image obtained by assigning an annotation to a three-dimensional object in the bird's-eye view image, a trained model by learning parameters of a machine learning model so that the trained model receives input of a bird's-eye view image and outputs a three-dimensional object in the bird's-eye view image; and cause a movement of a mobile object based on transmitting the trained model to the mobile object, wherein the trained model is stored in a storage of the mobile object.

7. A learning method executed by a computer comprising a processor and a memory, the learning method comprising:

associating, with an extended area in a bird's-eye view image, an annotation indicating that the extended area is a three-dimensional object, the extended area being extended due to conversion of a camera image capturing the area into the bird's-eye view image;

generating, based on training data in which an image and a bird's-eye view image obtained by converting the image into a bird's-eye view coordinate system are associated with an image obtained by performing an inverse bird's-eye view conversion process for an annotated bird's-eye view image obtained by assigning an annotation to a three-dimensional object in the bird's-eye view image, a trained model by learning parameters of a machine learning model so that the trained model receives input of an image and a bird's-eye view image obtained by converting the image into a bird's-eye view coordinate system and outputs a three-dimensional object in the image; and causing a movement of a mobile object based on transmitting the trained model to the mobile object, wherein the trained model is stored in a storage of the mobile object.

8. A mobile object control device comprising:

a non-transitory computer-readable storage medium storing computer-readable instructions; and a processor connected to the non-transitory computer-readable storage medium, wherein the processor executes the computer-readable instructions to:

acquire a target bird's-eye view image by converting a target image obtained by imaging surroundings of a mobile object using a camera mounted in the mobile object into a bird's-eye view coordinate system, detect a three-dimensional object in the target image by inputting the target image and the target bird's-eye view image to the trained model according to claim 7, detect an available traveling space of the mobile object on the basis of the detected three-dimensional object, and cause the mobile object to travel so that the mobile object passes through the available traveling space by generating a target trajectory and causing the mobile object to travel along the target trajectory by autonomous driving, or provide assistance for operation of a steering wheel of the mobile object so as to pass through the available traveling space.

9. A mobile object control method executed by a computer comprising a processor and a memory, the mobile object control method comprising:

acquiring, by the computer, a target bird's-eye view image by converting a target image obtained by imaging surroundings of a mobile object using a camera mounted in the mobile object into a bird's-eye view coordinate system;

detecting, by the computer, a three-dimensional object in the target image by inputting the target image and the target bird's-eye view image to the trained model according to claim 7;

detecting, by the computer, an available traveling space of the mobile object on the basis of the detected three-dimensional object; and causing, by the computer, the mobile object to travel so that the mobile object passes through the available traveling space by generating a target trajectory and causing the mobile object to travel along the target trajectory by autonomous driving, or provide assistance for operation of a steering wheel of the mobile object so as to pass through the available traveling space.

10. A learning device comprising:

a non-transitory computer-readable storage medium storing computer-readable instructions; and a processor connected to the non-transitory computer-readable storage medium, wherein the processor executes the computer-readable instructions to:

receive association of an extended area in a bird's-eye view image with an annotation indicating that the extended area is a three-dimensional object, the extended area being extended due to conversion of a camera image capturing the area into the bird's-eye view image;

generate, based on training data in which an image and a bird's-eye view image obtained by converting the image into a bird's-eye view coordinate system are associated with an image obtained by performing an inverse bird's-eye view conversion process for an annotated bird's-eye view image obtained by assigning an annotation to a three-dimensional object in the bird's-eye view image, a trained model by learning parameters of a machine learning model so that the trained model receives input of an image and a bird's-eye view image obtained by converting the image into a bird's-eye view coordinate system and outputs a three-dimensional object in the image; and cause a movement of a mobile object based on transmitting the trained model to the mobile object, wherein the trained model is stored in a storage of the mobile object.

11. A non-transitory computer-readable storage medium storing a program thereon, the program causing a computer to:

receive association of an extended area in a bird's-eye view image with an annotation indicating that the extended area is a three-dimensional object, the extended area being extended due to conversion of a camera image capturing the area into the bird's-eye view image;

generate, based on training data in which an image and a bird's-eye view image obtained by converting the image into a bird's-eye view coordinate system are associated with an image obtained by performing an inverse bird's-eye view conversion process for an annotated bird's-eye view image obtained by assigning an annotation to a three-dimensional object in the bird's-eye view image, a trained model by learning parameters of a machine learning model so that the trained model receives input of an image and a bird's-eye view image obtained by converting the image into a bird's-eye view coordinate system and outputs a three-dimensional object in the image; and cause a movement of a mobile object based on transmitting the trained model to the mobile object, wherein the trained model is stored in a storage of the mobile object.

12. A non-transitory computer-readable storage medium storing a program thereon, the program causing a computer to:

acquire a target bird's-eye view image by converting a target image obtained by imaging surroundings of a mobile object using a camera mounted in the mobile object into a bird's-eye view coordinate system, detect a three-dimensional object in the target image by inputting the target image and the target bird's-eye view image to the trained model according to claim 7, detect an available traveling space of the mobile object on the basis of the detected three-dimensional object, and cause the mobile object to travel so that the mobile object passes through the available traveling space by generating a target trajectory and causing the mobile object to travel along the target trajectory by autonomous driving, or provide assistance for operation of a steering wheel of the mobile object so as to pass through the available traveling space.

* * * * *